United States Patent [19]

Shibahara

[11] Patent Number: 5,875,009
[45] Date of Patent: Feb. 23, 1999

[54] SEQUENTIAL STAGGERED TYPE THIN FILM TRANSISTOR

[75] Inventor: Hideo Shibahara, Tokyo, Japan

[73] Assignee: NEC Corporation, Tokyo, Japan

[21] Appl. No.: 912,790

[22] Filed: Aug. 18, 1997

[30] Foreign Application Priority Data

Aug. 26, 1996 [JP] Japan .................................. 8-223857

[51] Int. Cl.$^6$ ............................ G02F 1/136; H01L 29/04
[52] U.S. Cl. ............................... 349/43; 349/47; 257/59
[58] Field of Search ............................ 349/42, 43, 47; 257/59

[56] References Cited

U.S. PATENT DOCUMENTS

| | | | |
|---|---|---|---|
| 4,907,861 | 3/1990 | Muto | 350/336 |
| 5,229,644 | 7/1993 | Wakai et al. | 257/749 |

FOREIGN PATENT DOCUMENTS

| | | |
|---|---|---|
| 57-122575 | 7/1982 | Japan . |
| 298333 | 8/1990 | Japan . |
| 7152048 | 6/1995 | Japan . |

OTHER PUBLICATIONS

F. Richou et al., "33.2: The 2S TFT Process for Low–Cost AMLCD Manufacturing", *SID 92 Digest*, pp. 619–622.

*Primary Examiner*—Hung Xuan Dang
*Assistant Examiner*—Joanne Kim
*Attorney, Agent, or Firm*—Sughrue, Mion, Zinn, Macpeak & Seas, PLLC

[57] ABSTRACT

There is herein disclosed a sequential staggered type thin film transistor in a liquid crystal display comprising a glass substrate, and a gate line, a drain line, a pixel electrode and the sequential staggered type thin film transistor formed on the glass substrate, wherein the sequential staggered type thin film transistor has a structure in which an amorphous silicon layer, a gate insulating film and a gate electrode are laminated in turn on a source electrode and a drain electrode, and the width of an outgoing line connecting the source electrode of the thin film transistor to the pixel electrode is smaller than that of the source electrode.

2 Claims, 7 Drawing Sheets

SEQUENTIAL STAGGERED TYPE THIN FILM TRANSISTOR

BACKGROUND OF THE INVENTION

1. Field of the Invention

The present invention relates to a distributing structure of a liquid crystal display device, and more specifically, it relates to the improvement of a sequential staggered type thin film transistor for use in the practice of active-matrix driving.

2. Description of the Related Art

A liquid crystal display device comprises a thin film transistor (TFT) glass substrate having a transparent pixel electrode, a counter electrode glass substrate having a transparent electrode formed all over its surface and a liquid crystal having a thickness of about 5 μm interposed therebetween, both the glass substrates being stuck so that the formed films may face each other, and the behavior of a liquid crystal molecule is controlled by a voltage applied between both the electrodes to accomplish an image display. Due to such a system, a display can be constituted more thinly as compared with a CRT.

FIG. 9 shows a section of a conventional liquid crystal display device. The same drawing also shows a normally white mode where a polarization axis of a polarizing plate 14 is set so that the display may become a light transmission state 16 in the case that no potential difference is present between a pixel electrode 6 and a counter electrode substrate, and so that the display may become a light cut-off state 17 in the case that the potential difference is present between the pixel electrode and the counter electrode substrate.

As driving techniques of the liquid crystal display device, there are a simple matrix drive in which a substrate having scanning lines formed with a transparent electrode and another substrate having signal lines formed with another transparent electrode are stuck so as to cross each other, a liquid crystal having a thickness of 5 μm being interposed therebetween, and a voltage is applied to a cross point at time division, and an active matrix drive method in which the switching of the pixel is carried out every pixel by TFT. If the simple matrix drive is used in a use such as the display of a personal computer or a word processing machine in which many scanning lines are required, a ratio of an actual drive time lowers, and a difference between effective voltages applied to the pixels by which the display is done (selected pixels) and the pixels by which no display is done (nonselected pixels) is small. In consequence, there is a problem that the contrast of a displayed image lowers. As a technique for preventing this problem of the contrast deterioration, an active matrix drive method using TFT in which amorphous silicon is employed for a semiconductor layer has been put to practical use.

FIG. 3 shows an equivalent circuit diagram of a conventional active matrix liquid crystal display. A drive method of an active matrix type liquid crystal display panel will be described with reference to the same drawing.

In FIG. 3, image signals are applied to drain lines X1, X2 ... Xn. At each of intersections of these drain lines and gate lines Y1, Y2 ... Yn, TFT 1 which is a thin film transistor is connected. The TFT 1 is connected to a pixel electrode, and between this pixel electrode and a counter electrode, a liquid crystal is interposed to constitute a pixel electrode capacitance 2. As shown in FIG. 4, drive pulses Z1, Z2 ... Zn are applied in turn to the gate lines Y1, Y2 ... Yn. The gate line Y1 will be described as an example. During a period when the drive pulse Z1 has a voltage of 20 V, the TFT 1 connected to the gate line Y1 becomes a conductive state, and the potential of the image signal applied to the drain line is written into the pixel electrode capacitance which is constituted of the pixel electrode, the counter electrode and the liquid crystal interposed therebetween. The period when the drive pulse Z1 has a voltage of 20 V is equal to $\frac{1}{60}$ n second which is obtained by dividing a screen rewrite time, i.e., $\frac{1}{60}$ second by the number n of the scanning lines. Next, during a period when the drive pulse Z1 is 0 V, the TFT connected to the gate line Y1 becomes an insulating state, and the potential of the image signal written on the pixel electrode capacitance is maintained until the drive pulse Z1 has become 20 V again in the next scan. In this way, the display of the image is carried out.

As a thin film transistor structure which can be used in the active matrix liquid crystal display, a sequential staggered type thin film transistor has been suggested by F. Richou et al. ("The "2S" TFT Process for Low-Cost AMLCD Manufacturing", Proceedings of Euro Display, p. 619–622, '84, Sep. 18–20, '84 Paris).

This thin film transistor can be manufactured by patterning twice, and so it is characterized by the easiness of the manufacture.

FIG. 8 shows the constitution of one pixel of the liquid crystal display having a conventional sequential staggered type thin film transistor. In the same drawing, (a) shows its plan, and (b) shows a section cut along the line A-B in (a).

The section cut along the line A-B in FIG. 8 exhibits a channel portion through which current flows from the drain line in the case that the TFT is in the ON state. When a drive pulse is applied to the gate line 4, an amorphous silicon layer 9 becomes a conductive state, and the potential of the image signal applied to a drain line 5 is written into the pixel electrode capacitance which is constituted of the pixel electrode 6, the counter electrode and the liquid crystal interposed therebetween (the TFT is in the ON state).

In the case that any drive pulse is not applied to the gate line 4, the amorphous silicon layer 9 becomes a nonconductive state, and the potential of the image signal written on the pixel electrode capacitance is maintained (the TFT is in the OFF state).

Here, in the case that the TFT is in the OFF state, there occurs a phenomenon that a leak current flows from the pixel electrode 6 to the drain line 5 through an edge portion 12 of the gate line 4. This can be supposed to be due to a fact that three layers of the amorphous silicon layer 9, a silicon nitride layer 10 and a chromium layer 11 are simultaneously patterned with the pattern of the gate line 4 at the time of the manufacture, and hence in the edge portion 12 of the gate line of from the pixel electrode 6 to the drain line 5, dangling bonds which are unbonded hands of silicon atoms occur in the amorphous silicon layer 9, so that the current easily flows.

In consequence, the voltage of the pixel electrode 6 written during the time when the TFT is in the ON state changes, so that the deterioration of contrast on the display takes place inconveniently.

SUMMARY OF THE INVENTION

An object of the present invention is to reduce a leak current which flows from a pixel electrode to a drain line through an edge portion of a gate line.

The present invention, which can solve the above problems, is directed to a sequential staggered type thin film transistor in a liquid crystal display device comprising a glass substrate, and a gate line, a drain line, a pixel electrode and the sequential staggered type thin film transistor formed on the substrate, wherein the sequential staggered type thin film transistor has a structure in which an amorphous silicon layer, a gate insulating film and a gate electrode are laminated in this order on a source electrode and a drain electrode, and the width of an outgoing line connecting the source electrode of the thin film transistor to the pixel electrode is smaller than that of the source electrode.

According to the constitution of the present invention, a leak current in the case that the TFT is in the OFF state can be remarkably reduced, whereby there can be obtained a liquid crystal display having a high contrast in which the display contrast scarcely deteriorates.

DETAILED DESCRIPTION OF THE PREFERRED EMBODIMENTS

Figure 1A:
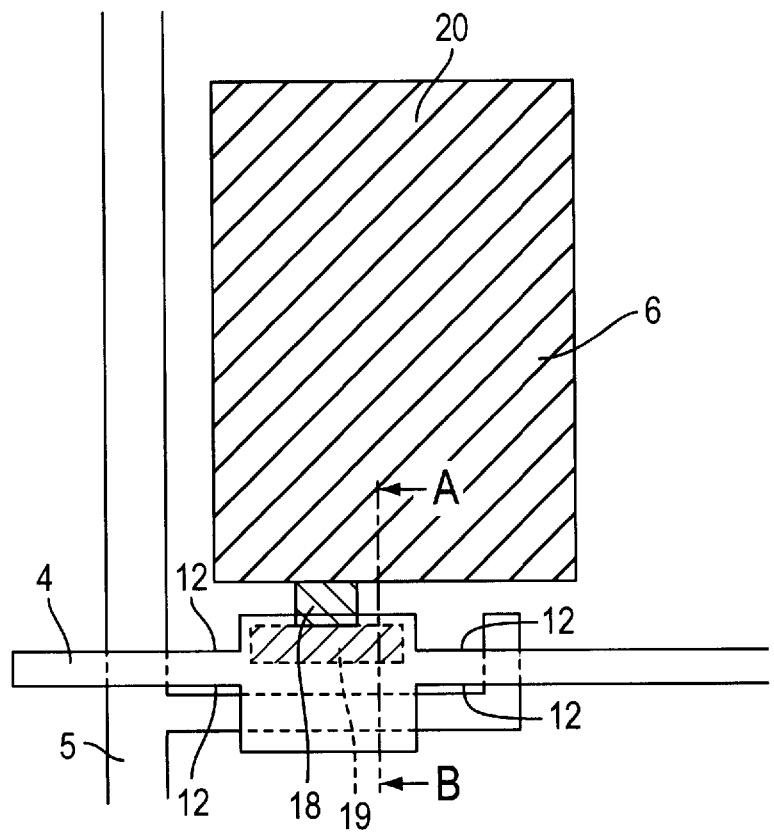
FIG. 1 shows the constitution of one pixel of a sequential staggered type thin film transistor of the first embodiment according to the present invention, and (a) is a plan and (b) is a section along a line A-B in (a).
Figure 1B:
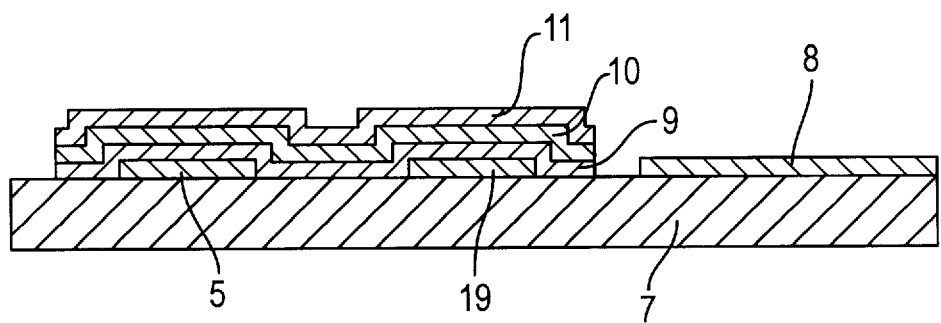

A plan and a section of the first embodiment of the present invention are shown in FIG. 1(a) and FIG. 1(b), respectively.

In FIG. 1(a), a gate line 4 is on an uppermost layer and is arranged so as to overlap a drain line 5 and a pixel electrode 6 on a lowermost layer. Here, the pixel electrode 6 will be described by dividing the same into an outgoing portion 18, a source portion 19 and a pixel electrode portion 20 which are distinguished from each other by hatching.

FIG. 1(b) shows a section along the line A-B in FIG. 1(a), and it exhibits a glass substrate 7, an ITO layer 8 forming a drain line 5 and a pixel electrode 6, an amorphous silicon layer 9, a silicon nitride layer 10 and a chromium layer 11 forming a gate line 4 in turn from the lowermost layer.

Figure 3:
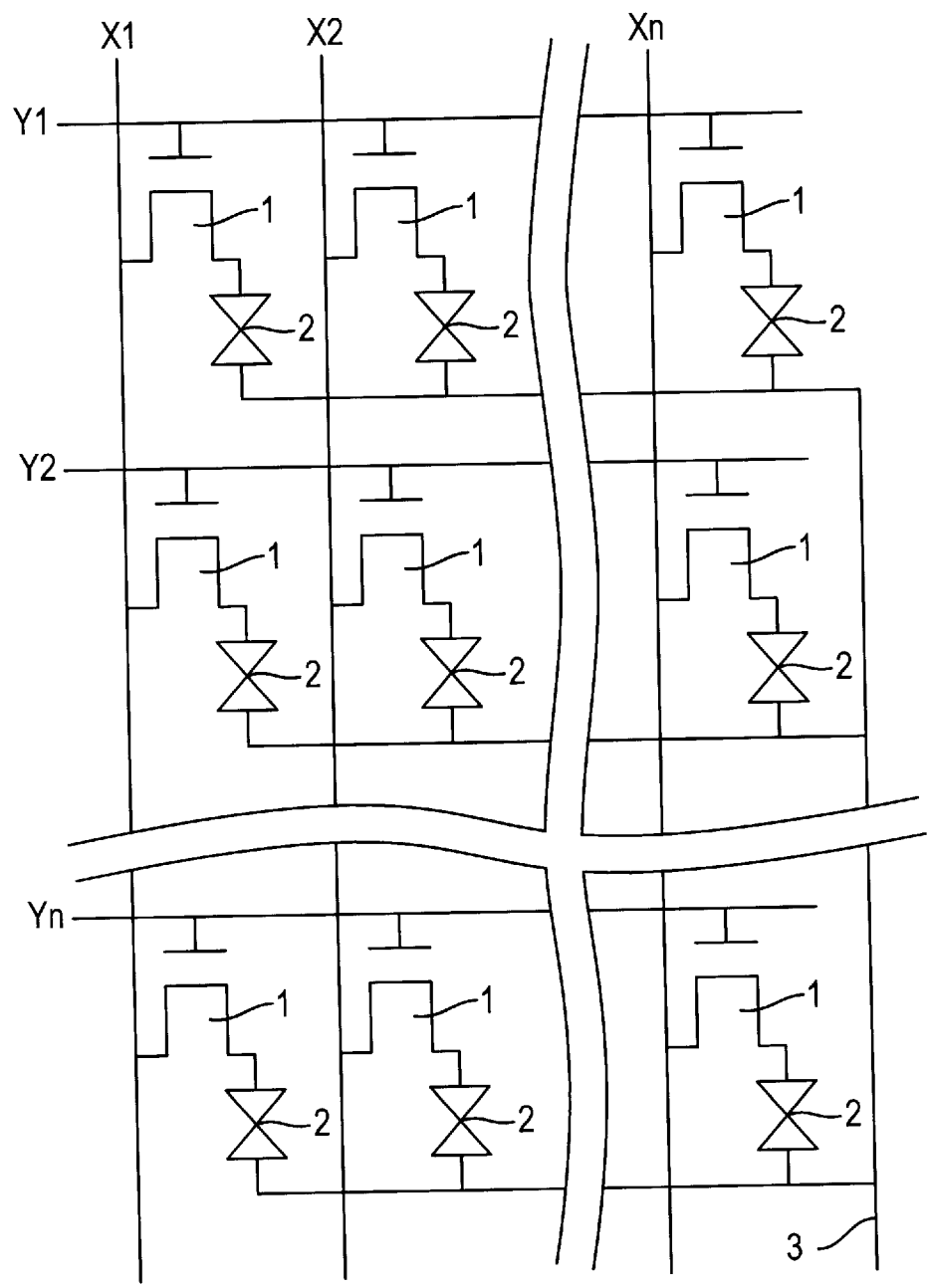
FIG. 3 shows an equivalent circuit diagram of a conventional active matrix liquid crystal display.
Figure 4:
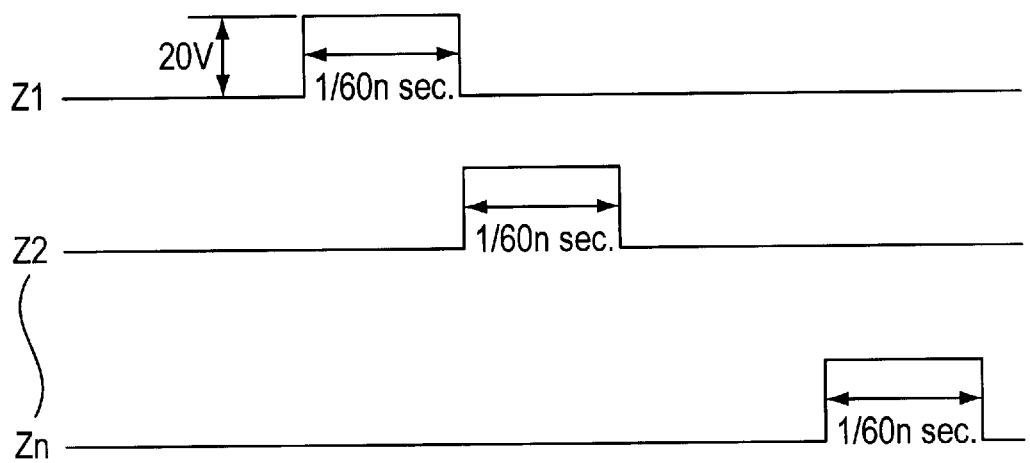
FIG. 4 shows a waveform of a signal which is applied to scanning lines Y1 to Yn in FIG. 3.

Operation as a TFT will be described. When an ON voltage is applied to the gate line 4, the amorphous silicon layer 9 becomes a conductive state, so that current flows from the drain line 5 to the source portion 19 of the pixel electrode 6. When an OFF voltage is applied to the gate line 4, the amorphous silicon layer 9 becomes a nonconductive state, so that an electric charge is maintained in a pixel electrode capacitance 2, as shown in FIG. 3.

Here, the width of the outgoing portion 18 is smaller than that of the source portion 19, and so the distance of from the outgoing portion 18 to the edge portion 12 of the gate line is longer than in a conventional case and the resistance in the edge portion increases. In consequence, there can be reduced the leak current which flows from the pixel electrode 6 to the drain line 5 when the TFT is in the OFF state.

Figure 5A:
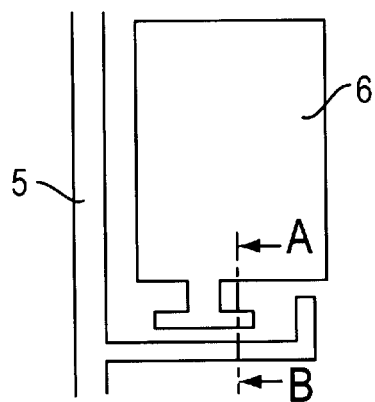
FIGS. 5 to 7 show the process of the sequential staggered type thin film transistor of the first embodiment according to the present invention, and in each drawing, (a) is a plan and (b) is a section along a line A-B in (a).
Figure 5B:
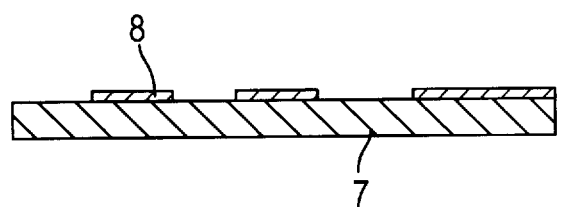
Figure 6A:
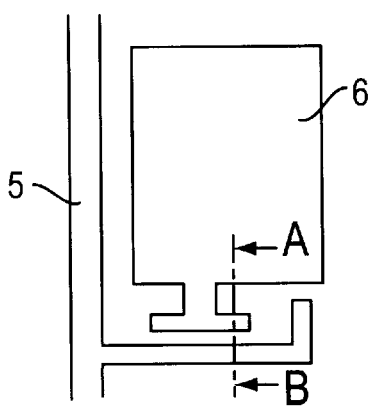
Figure 6B:
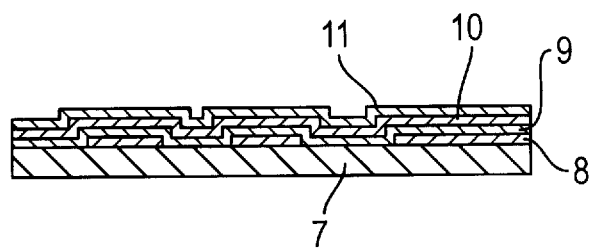
Figure 7A:
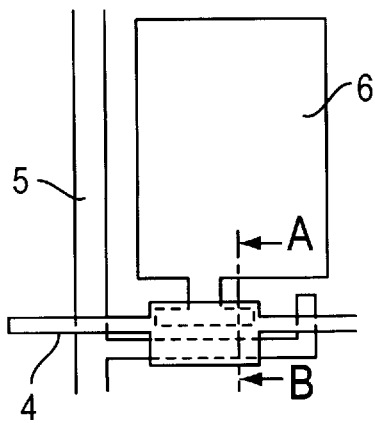
Figure 7B:
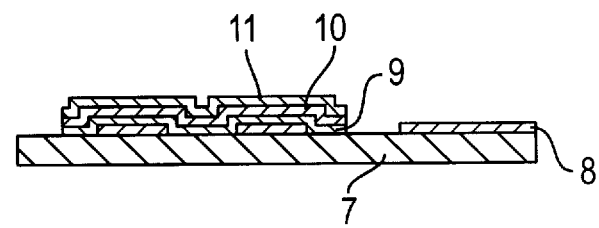
Figure 8A:
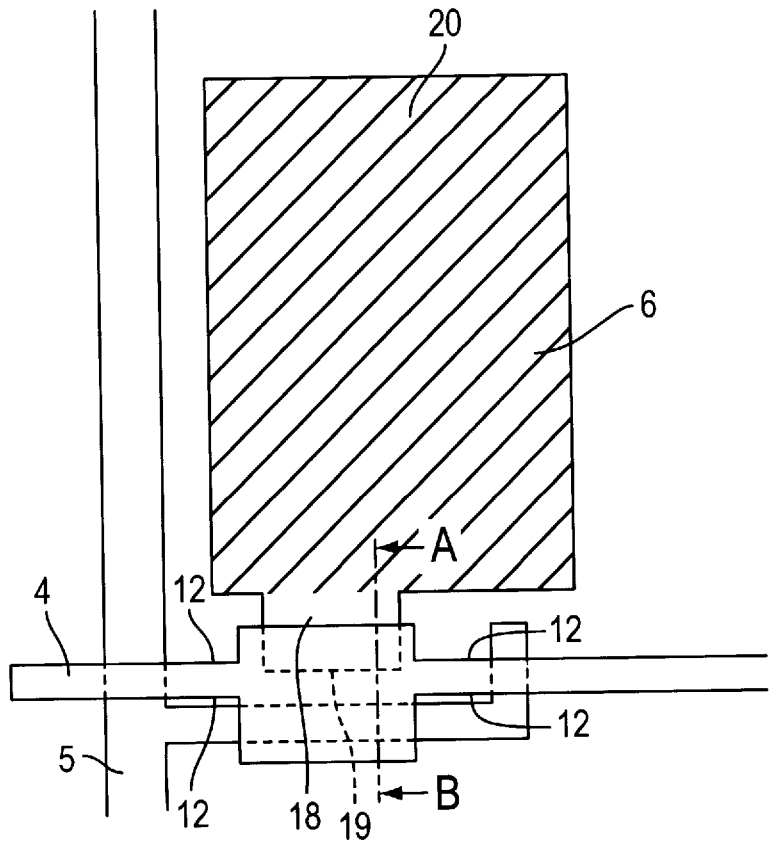
FIG. 8 shows the constitution of one pixel of a conventional sequential staggered type thin film transistor, and (a) is a plan and (b) is a section along a line A-B in (a).
Figure 8B:
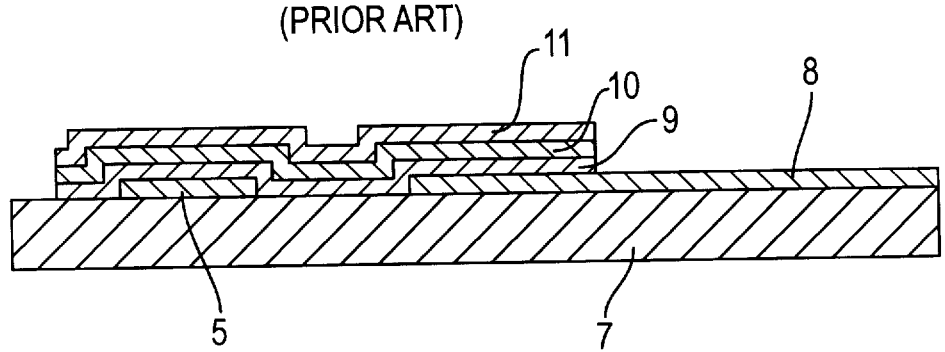
Figure 9:
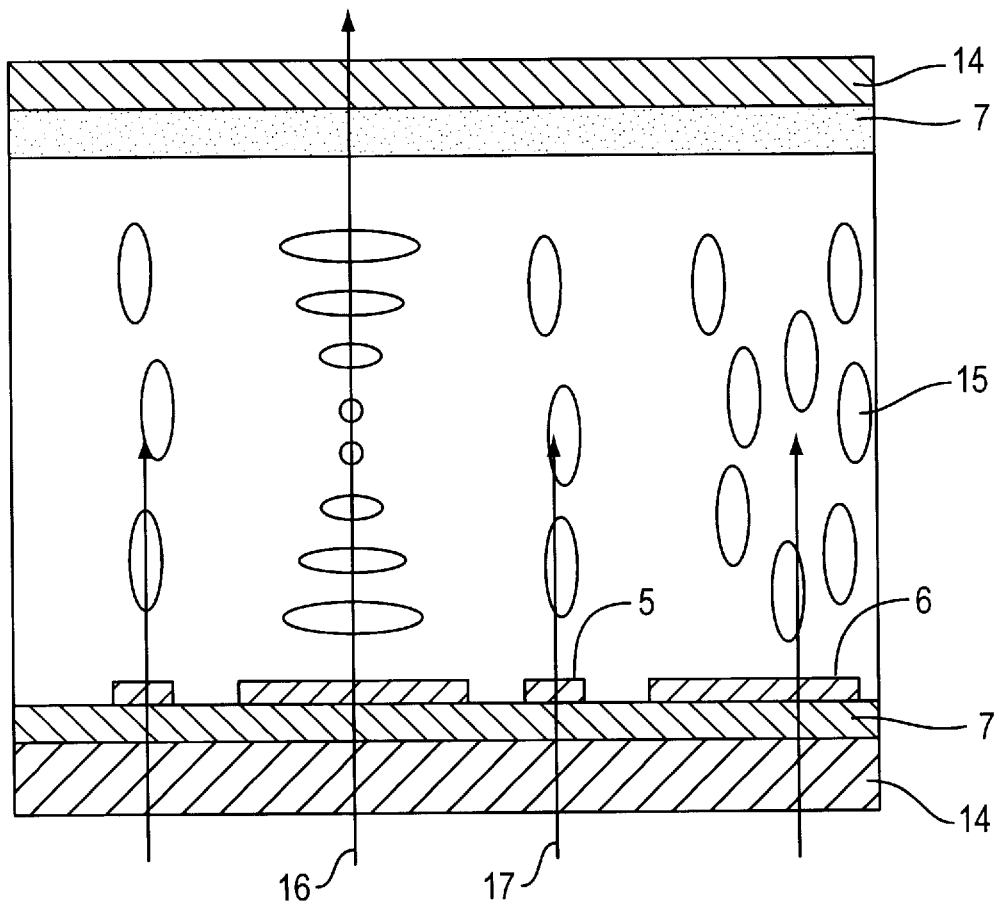
FIG. 9 is a schematic section of a conventional liquid crystal display.

Next, a manufacturing method of a liquid crystal display of the first embodiment according to the present invention will be described with reference to FIGS. 5, 6 and 7 as follows.

On a glass substrate 7, the ITO layer 8 is formed by a sputtering device, and a resist is then applied thereonto. Afterward, the resist is exposed through pattern masks of the drain line 5 and the pixel electrode 6, and then developed, whereby the resist having the patterns of the drain line 5 and the pixel electrode 6 is left. Next, etching is carried out to pattern the drain line 5 and the pixel electrode 6, and the resist is then peeled (FIG. 5). Then, a plasma treatment is done by a plasma CVD device, whereby the patterned portions alone are altered so as to be in such a state as ohmic contact is possible. Next, the amorphous silicon layer 9 and the silicon nitride layer 10 are formed by the plasma CVD device, and the chromium layer 11 is formed in turn by the sputtering device (FIG. 6). Afterward, a resist is applied, exposed through a pattern mask of scanning lines by an exposure device, and then developed, whereby the resist having the pattern of the scanning lines is left. The chromium layer 11, the amorphous silicon layer 9 and the silicon nitride layer 10 are patterned by etching through the pattern of the scanning lines, and the resist is then peeled, whereby the constitution of the TFT side of the liquid crystal device is completed (FIG. 7).

Figure 2A:
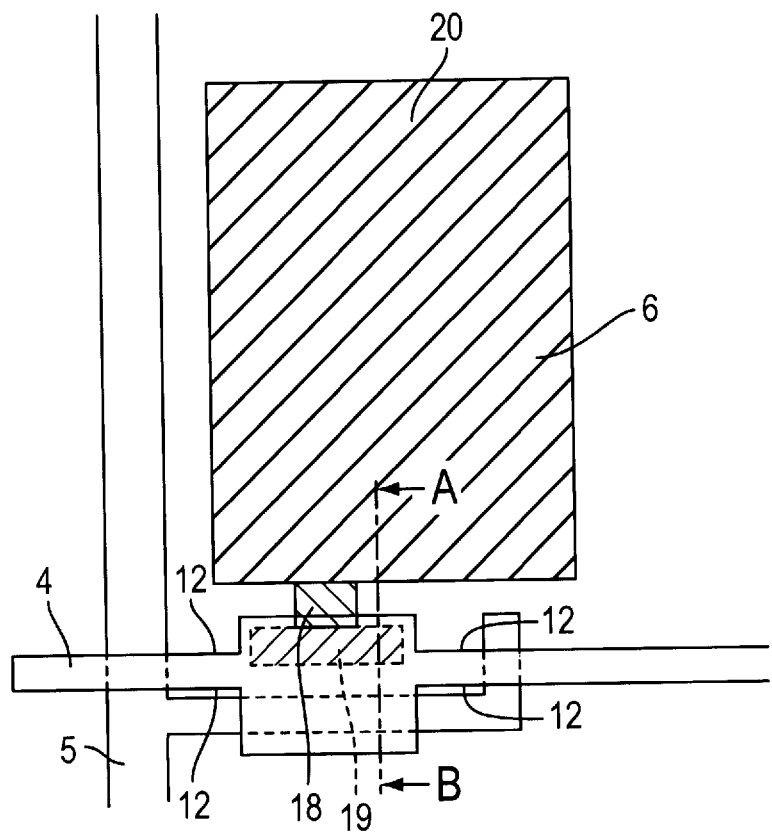
FIG. 2 shows the constitution of one pixel of a sequential staggered type thin film transistor of the second embodiment according to the present invention, and (a) is a plan and (b) is a section along a line A-B.
Figure 2B:
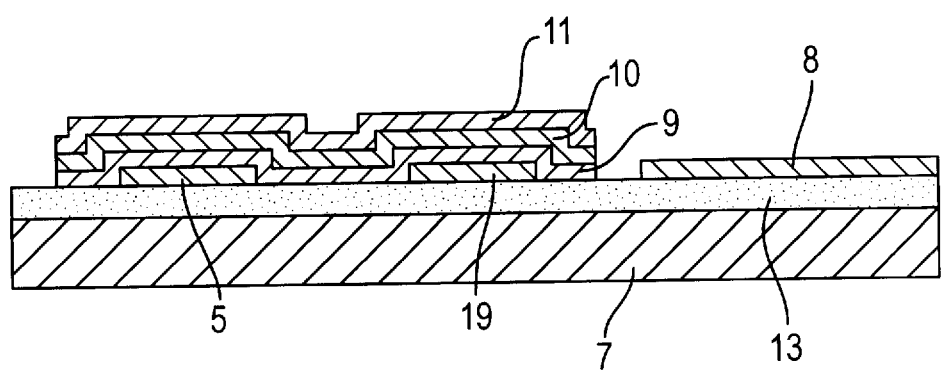

A plan and a section of the second embodiment of the present invention are shown in FIG. 2(a) and FIG. 2(b), respectively. The structure of the second embodiment is the same as in the first embodiment except that a protective layer 13 is additionally formed onto the glass substrate 7. As in the first embodiment, the leak current during the period when the TFT is in the OFF state can be reduced. Furthermore, since the protective layer 13 is present on the glass substrate 7, an impurity such as sodium is not oozed from the glass substrate 7, so that the thin film transistor is not inversely affected. Thus, the reliability of the transistor can be enhanced.

What is claimed is:

1. A sequential staggered type thin film transistor in a liquid crystal display device comprising a glass substrate, and a gate line, a drain line, a pixel electrode and the sequential staggered type thin film transistor formed on the glass substrate, wherein the sequential staggered type thin film transistor has a structure in which an amorphous silicon layer, a gate insulating film and a gate electrode are laminated in this order on a source electrode and a drain electrode, and the width of an outgoing line connecting the source electrode of the thin film transistor to the pixel electrode is smaller than that of the source electrode.

2. The sequential staggered type thin film transistor according to claim 1, wherein a protective layer is formed on the glass substrate.

* * * * *